US008113810B2

(12) United States Patent
Tsai

(10) Patent No.: US 8,113,810 B2
(45) Date of Patent: Feb. 14, 2012

(54) EXTRUSION DIE ASSEMBLY

(76) Inventor: Se-Hsing Tsai, Tainan County (TW)

( * ) Notice: Subject to any disclaimer, the term of this patent is extended or adjusted under 35 U.S.C. 154(b) by 890 days.

(21) Appl. No.: 12/136,564

(22) Filed: Jun. 10, 2008

(65) Prior Publication Data
US 2009/0304837 A1    Dec. 10, 2009

(51) Int. Cl.
*A21C 3/00* (2006.01)
(52) U.S. Cl. .................... 425/131.1; 425/130; 425/380; 425/381; 425/461; 425/462; 425/463
(58) Field of Classification Search .......... 425/380–381, 425/130–131.1, 461–463
See application file for complete search history.

(56) References Cited

U.S. PATENT DOCUMENTS
4,208,175 A * 6/1980 Rosenbaum ............... 425/131.1
* cited by examiner

*Primary Examiner* — Yogendra Gupta
*Assistant Examiner* — Amjad Abraham
(74) *Attorney, Agent, or Firm* — Schwegman, Lundberg & Woessner, P.A.

(57) ABSTRACT

An extrusion die assembly includes a hollow extrusion head which has a head inner surface, a central passage inlet opening, a forming section having a die opening, and a receiving space that extends from the central passage inlet opening to the forming section. A flow-dividing core is disposed within the receiving space, and has a central passage connected to the central passage inlet opening and extending to the forming section, and a grooved outer surface that is disposed upstream of the forming section and that has at least one groove which cooperates with the head inner surface to define at least one accumulating passage. An annular passage is formed in the forming section and around the flow-dividing core and the central passage, is connected to the accumulating passage, and merges with the central passage in the die opening.

9 Claims, 8 Drawing Sheets

EXTRUSION DIE ASSEMBLY

BACKGROUND OF THE INVENTION

1. Field of the Invention

The invention relates to an extrusion die assembly, more particularly to an extrusion die assembly for extrusion of a plate having a multi-layered structure or a core-and-shell structure.

2. Description of the Related Art

It is known to produce extruded plates having a multi-layered stack structure or a multi-layered core-and-shell structure. The multi-layered stack structure has differently colored layers disposed one on top of the other. The multi-layered stack structure is simple, and can be extruded easily using the known extrusion method. On the other hand, the multi-layered core-and-shell structure has one or more shell layers covering an outer surface of a core. Since it is very difficult to control the material of the shell layer to uniformly cover the outer surface of the core, the current method includes extruding a core first, after which the core is passed through a second extrusion die to form the shell layer. When a core-and-shell structure having four shell layers is to be manufactured, four extrusion steps must be carried out. Hence, such a method for extruding multi-layered core-and-shell structures is time-consuming, and the processing steps are complicated.

SUMMARY OF THE INVENTION

Therefore, the object of the present invention is to provide an improved extrusion die assembly for extrusion of a core-and-shell structure by which the aforementioned drawbacks of the prior art can be overcome.

According to this invention, an extrusion die assembly comprises a hollow extrusion head, a flow-dividing core, and an annular passage. The hollow extrusion head includes a head inner surface, a central passage inlet opening, a forming section having a die opening, a first receiving space that extends from the central passage inlet opening to the forming section, a lateral passage inlet opening, and a second receiving space having one end connected to the lateral passage inlet opening and the other end connected fluidly to the first receiving space midway between the central passage inlet opening and the die opening. The flow-dividing core is disposed within the first receiving space, and is hollow. The flow-dividing core has a central passage connected to the central passage inlet opening and extending to the forming section, and a grooved outer surface that is disposed upstream of the forming section and that has at least one groove which cooperates with the head inner surface to define at least one accumulating passage. The annular passage is formed in the forming section and around the flow-dividing core and the central passage, is connected to the accumulating passage, and merges with the central passage in the die opening.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
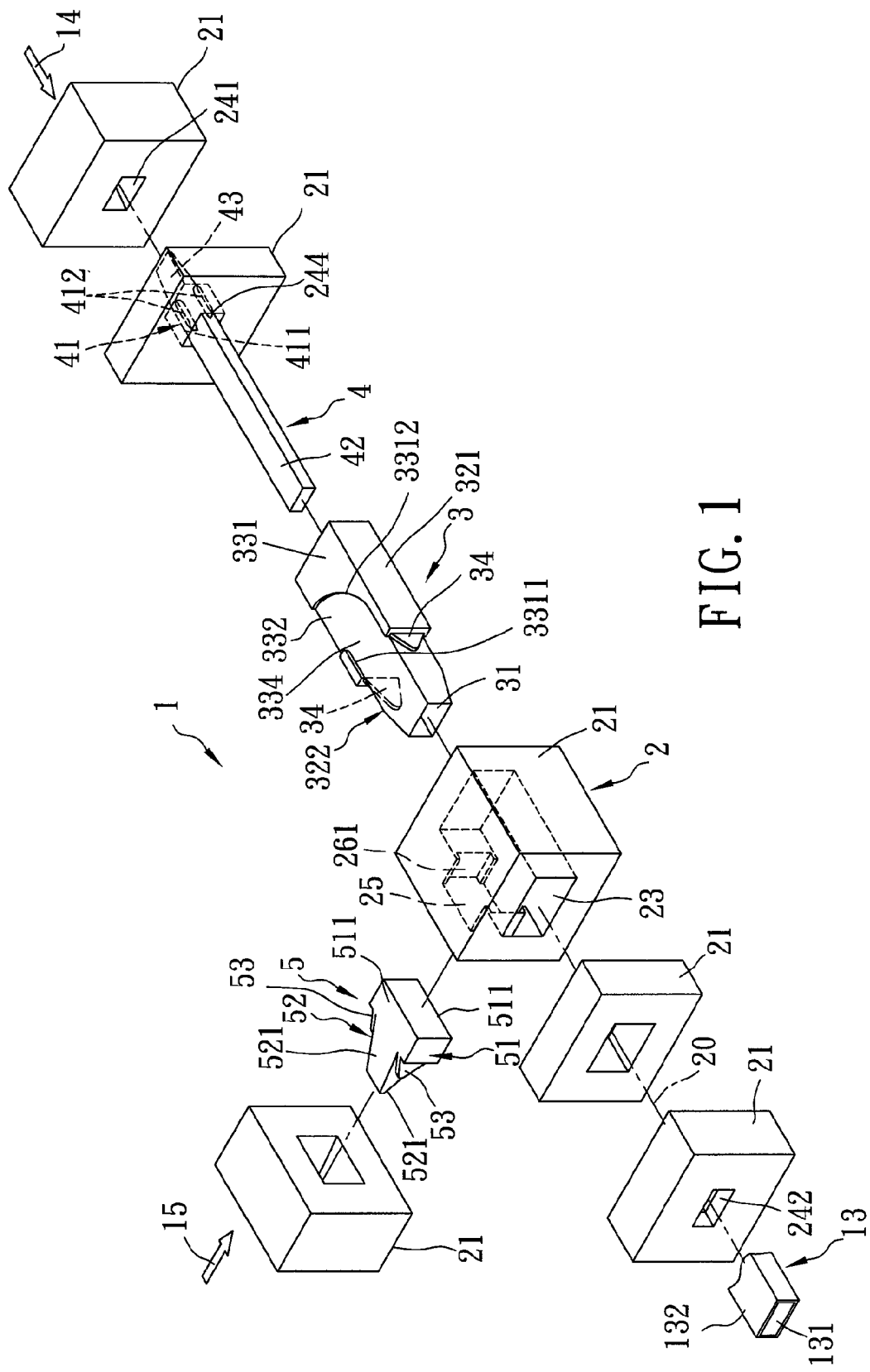
FIG. 1 is an exploded perspective view of an extrusion die assembly according to the first preferred embodiment of the present invention.
Figure 2:
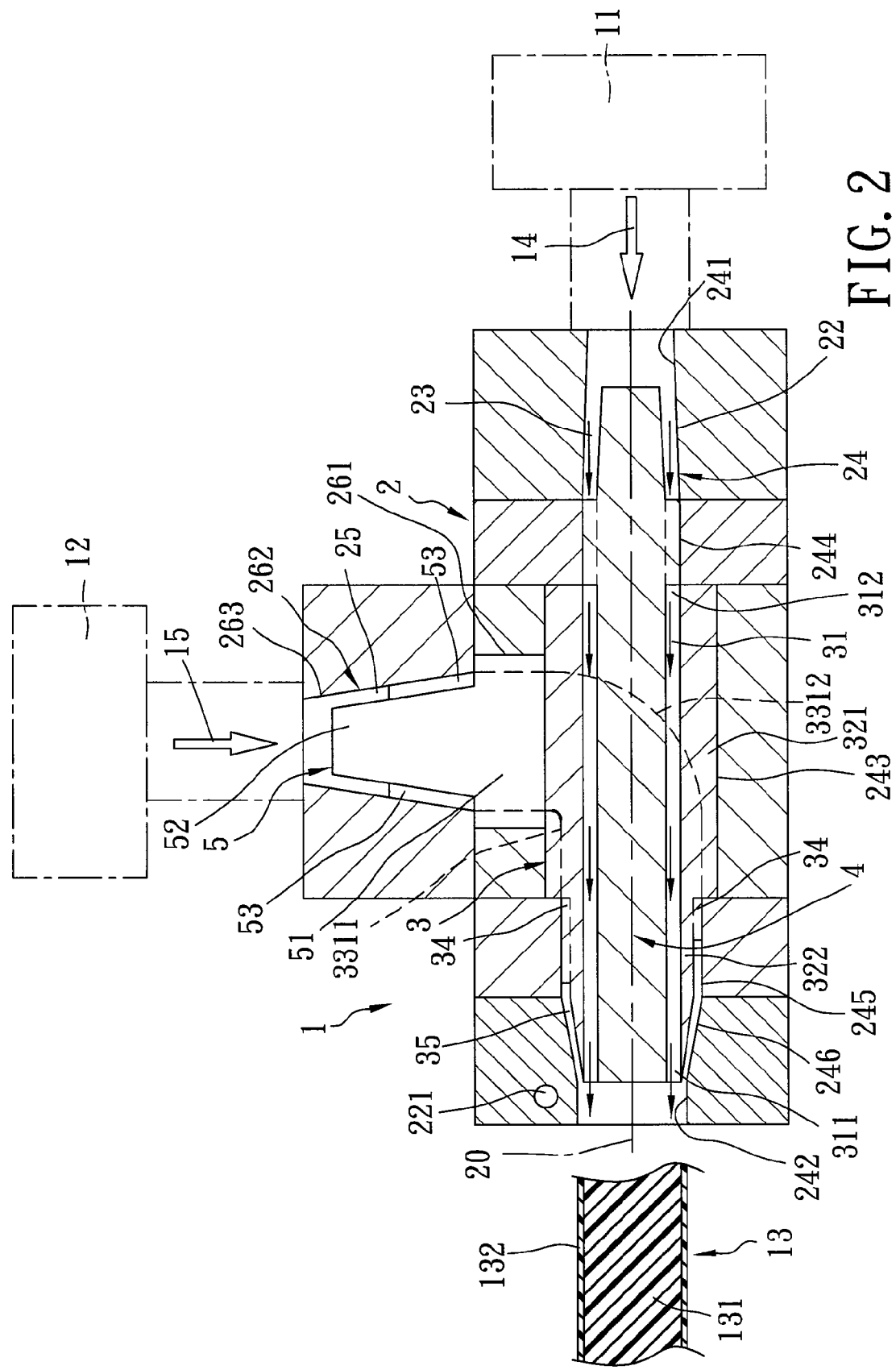
FIG. 2 is a sectional view of the first preferred embodiment in an assembled state.
Figure 3:
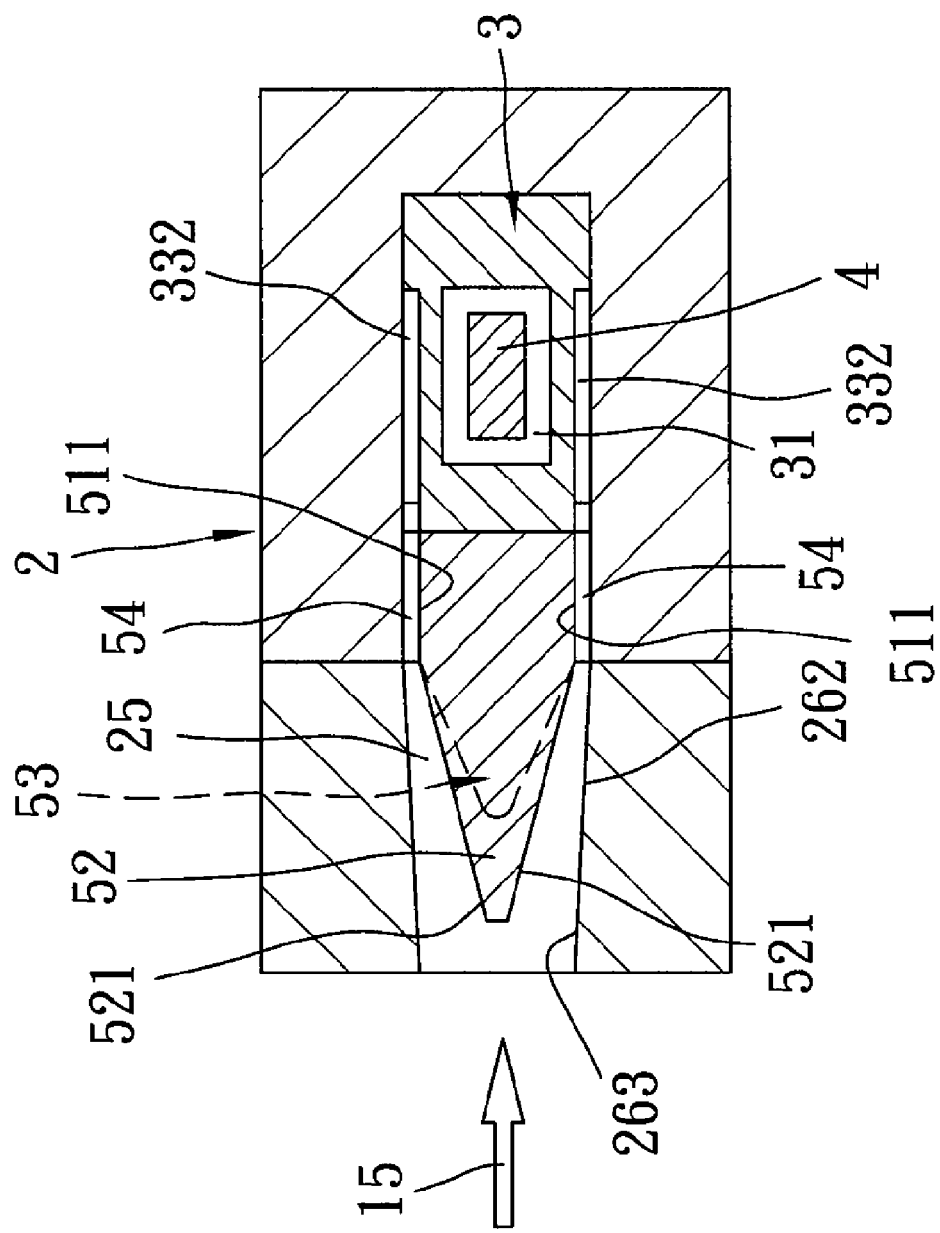
FIG. 3 is another sectional view of the first preferred embodiment in an assembled state.
Figure 4:
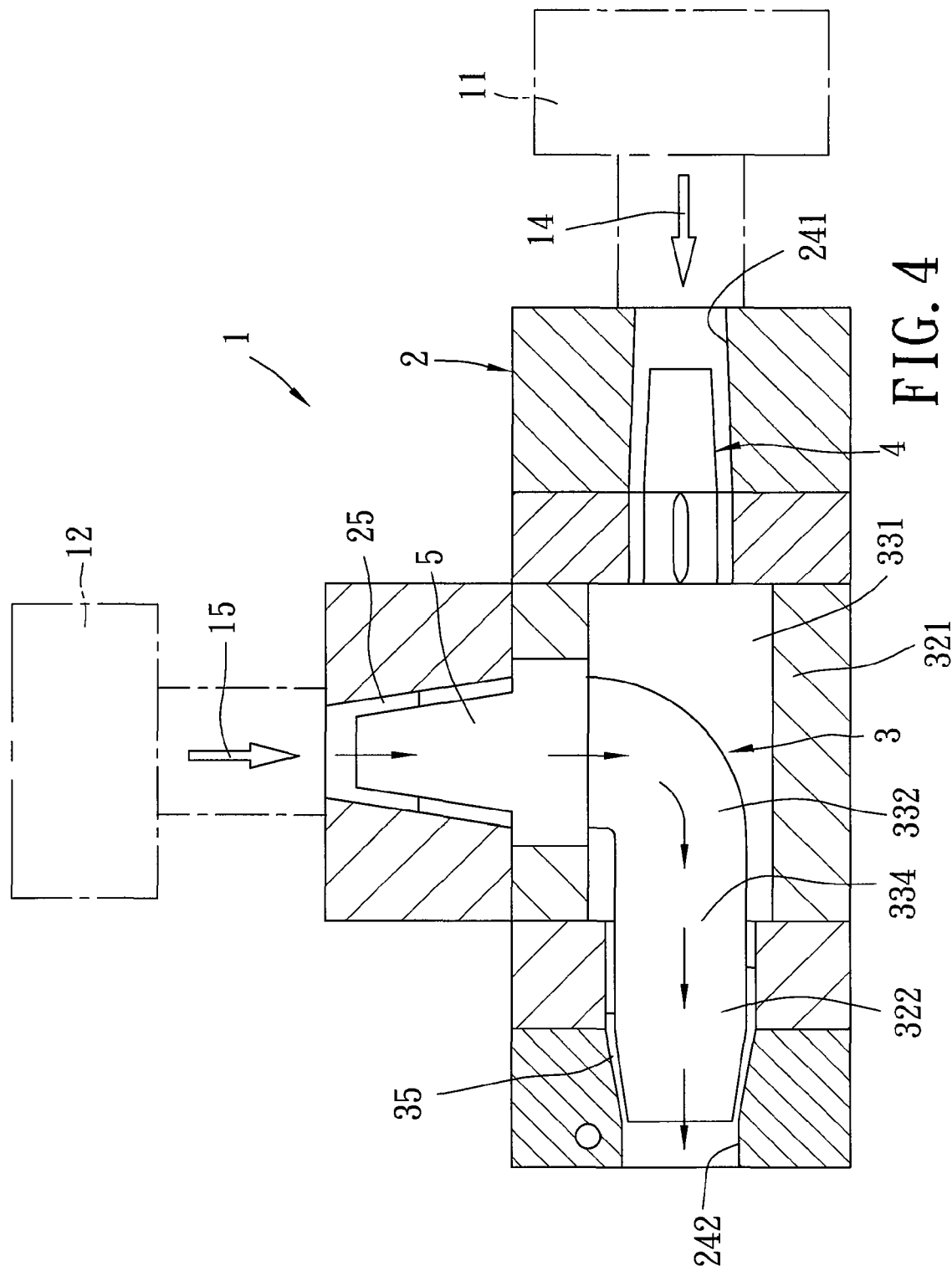
FIG. 4 is a view similar to FIG. 2, but illustrating a first flow-dividing core which is not sectioned.

Before the present invention is described in greater detail, it should be noted that the same reference numerals have been used to denote like elements throughout the specification.

Referring to FIGS. 1 to 4, an extrusion die assembly 1 according to the first preferred embodiment of the present invention is adapted to be connected to two feeders 11, 12 so as to extrude a core-and-shell structural plate 13 with a uniform shell structure. The extruded plate 13 has an elongated core 131 and a shell layer 132 covering an outer surface of the core 131. The feeder 11 supplies a first molten material 14 to form the core 131. The feeder 12 supplies a second molten material 15 to form the shell layer 132. Each of the first and second molten materials 14, 15 may be molten plastic including different proportions of wood powder, flame retardants, coloring materials, and/or foaming agents. In this embodiment, the first material 14 includes a foaming agent.

The extrusion die assembly 1 comprises a hollow extrusion head 2, a first flow-dividing core 3, a mandrel 4, and a first flow-dividing block 5.

The extrusion head 2 is formed by a plurality of interconnected die blocks 21, and includes a head inner surface 22, a central passage inlet opening 241 adapted to be connected to the feeder 11, a forming section 245 having a die opening 242, a first receiving space 23 extending from the central passage inlet opening 241 to the forming section 245 along an axial line 20, a first lateral passage inlet opening 263, and a second receiving space 25 that is perpendicular to the axial line 20. The head inner surface 22 has a tapered part 246 at the forming section 245 and tapering toward the die opening 242. The first receiving space 23 has a mandrel-retaining portion 244 proximate to the central passage inlet opening 241, and a core-retaining portion 243 disposed between the mandrel-retaining portion 244 and the die opening 242. The second receiving space 25 has one end connected to the first lateral passage inlet opening 263, and another end connected fluidly to the first receiving space 23 midway between the central passage inlet opening 241 and the die opening 242. The head inner surface 22 further has a cooling channel 221 proximate to the die opening 242.

The first flow-dividing core 3 is hollow, and is disposed within the first receiving space 23. The first flow-dividing core 3 includes a central passage 31 defined by an inner surface thereof and having a rectangular cross section, a first grooved outer surface 331 that is disposed upstream of the forming section 245 and that is formed with two grooves 332, a first core base portion 321 that is disposed in the core-retaining portion 243 and that has the first grooved outer surface 331 which defines the grooves 332 respectively at opposite upper and lower sides thereof, and a first guide portion 322 smaller in cross section than the first core base portion 321. The central passage 31 has one end 312 connected to the central passage inlet opening 241, and another end 311 extending to the forming section 245 so as to connect with the die opening 242. The grooves 332 cooperate with the head inner surface 22 to define a pair of first accumulating passages 334 (only one is visible in FIGS. 1 and 4) at the upper and lower sides of the first core base portion 321.

The second receiving space 25 includes a block-retaining section 261 proximate to the first accumulating passages 334, and a tapered section 262 proximate to the first lateral passage inlet opening 263.

The first grooved outer surface 331 abuts against the core-retaining portion 243 when the first core base portion 321 is disposed in the same. The grooves 332 are curved so that the first accumulating passages 334 are also curved. Each groove 332 is bounded by opposite short and long curved groove walls 3311, 3312.

The first guide portion 322 extends from the first core base portion 321, and tapers toward the die opening 242. The first flow-dividing core 3 further includes two wedge-shaped guide parts 34 that taper from the first core base portion 321 toward the die opening 242 and that project respectively from two opposite sides of the first guide portion 322.

A first annular passage 35 is formed in the forming section 245 for passage of the second molten material 15 therethrough, and is defined by the head inner surface 22 and the first flow-dividing core 3. The first annular passage 35 extends around the central passage 31 and the first guide portion 322 upstream of the die opening 242. Further, the first annular passage 35 is connected to the first accumulating passages 334, and merges with the central passage 31 in the die opening 242.

The mandrel 4 is inserted detachably into the first receiving space 23, and includes a retained section 41 retained by the mandrel-retaining portion 244, a first section 42 extending from one side of the retained section 41 into the central passage 31, and a tapered second section 43 extending from the other opposite side of the retained section 41 and tapering toward the central passage inlet opening 241. The retained section 41 has a connecting part 411 extending along the axial line 20, and a plurality of spaced-apart ribs 412 spaced apart from the connecting part 411 and abutting against the mandrel-retaining portion 244. As such, the first molten material 14 can flow past the retained section 41 and move toward the first section 42. The first section 42 has a cross sectional shape similar to that of the central passage 31, but the cross sectional area of the first section 42 is smaller than that of the central passage 31, so that the first molten material 14 can flow through a gap between the first section 42 and the inner surface of the first flow-dividing core 3 toward the die opening 242.

The mandrel 4 of this embodiment is used in cooperation with the first molten material 14 which includes the foaming agent. Since the volume of the first molten material 14 before and after the forming process differs greatly, the amount of the first molten material 14 should be small. The mandrel 4 is used to limit the input amount of the first molten material 14. However, when the core 131 of the extruded plate 13 is to be made of a non-foaming material, the mandrel 4 can be removed from the extrusion head 2. Thus, the mandrel 4 is an optional component in the present invention.

The first flow-dividing block 5 is disposed within the second receiving space 25, the purpose of which is to divide the second receiving space 25 into two first lateral passages 54 which are connected to the first lateral passage inlet opening 263, thereby dividing an inlet flow of the second molten material 15 entering through the first lateral passage inlet opening 263. The first lateral passages 54 are connected respectively to the first accumulating passages 334, and are substantially perpendicular to the central passage 31. The first flow-dividing block 5 includes a first block base portion 51 retained fittingly in the block-retaining section 261, a main wedge-shaped portion 52 received in the tapered section 262 and tapered from the first block base portion 51 toward the first lateral passage inlet opening 263, and two auxiliary wedge-shaped portions 53 projecting respectively from two opposite sides of the main wedge-shaped portion 52 and tapering from the first block base portion 51 toward the first lateral passage inlet opening 263. The first block base portion 51 has two opposite planar faces 511. The main wedge-shaped portion 52 has two opposite slanting faces 521 connected respectively to the planar faces 511. The planar faces 511 and the slanting faces 521 cooperate with the head inner surface 22 to define the first lateral passages 54.

During use of the extrusion die assembly 1, the first molten material 14 is sent into the central passage inlet opening 241 through the feeder 11, and flows into the central passage 31. The first molten material 14 finally flows out of the end 311 of the central passage 31 to the die opening 242. Since the cooling channel 221 is provided in proximity to the die opening 242, the first molten material 14 is solidified to form the core 131. Simultaneously, the second molten material 15 is sent into the second receiving space 25 through the feeder 12. Since the first flow-dividing block is disposed within the second receiving space 25, the second molten material 15 is divided into two flows that go through the first lateral passages 54 and the first accumulating passages 334, and then merge in the first annular passage 35. When reaching the die opening 242, the second molten material 15 covers an outer periphery of the core 131. The second molten material 15, when solidified, forms the shell layer 132.

As described above, with the use of the first preferred embodiment, the plate 13 composed of the core 131 and the shell layer 132 can be extruded through a single continuous processing step. The manufacturing process is therefore simplified and the speed thereof is increased.

Figure 5:
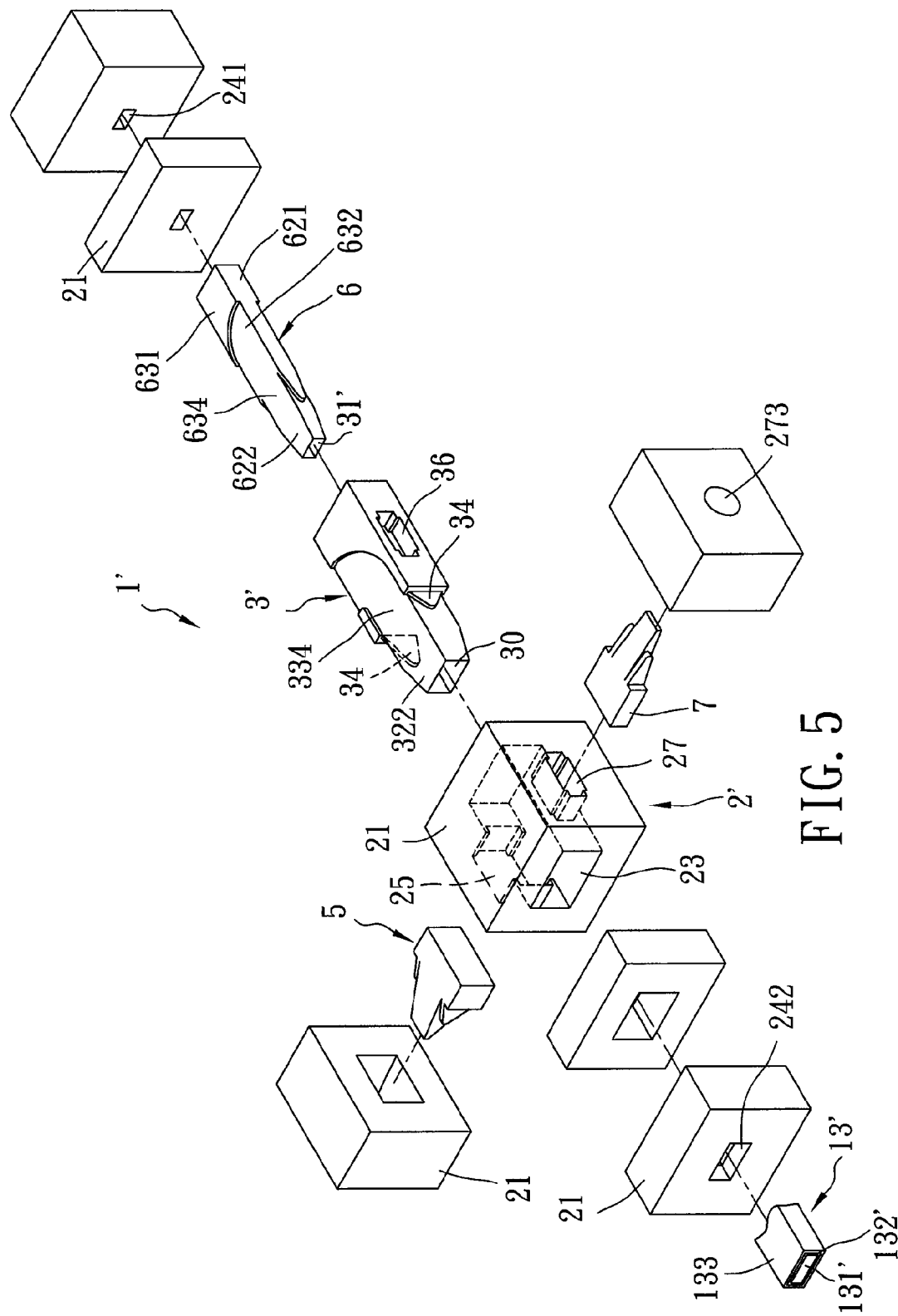
FIG. 5 is an exploded perspective view of an extrusion die assembly according to the second preferred embodiment of the present invention.
Figure 6:
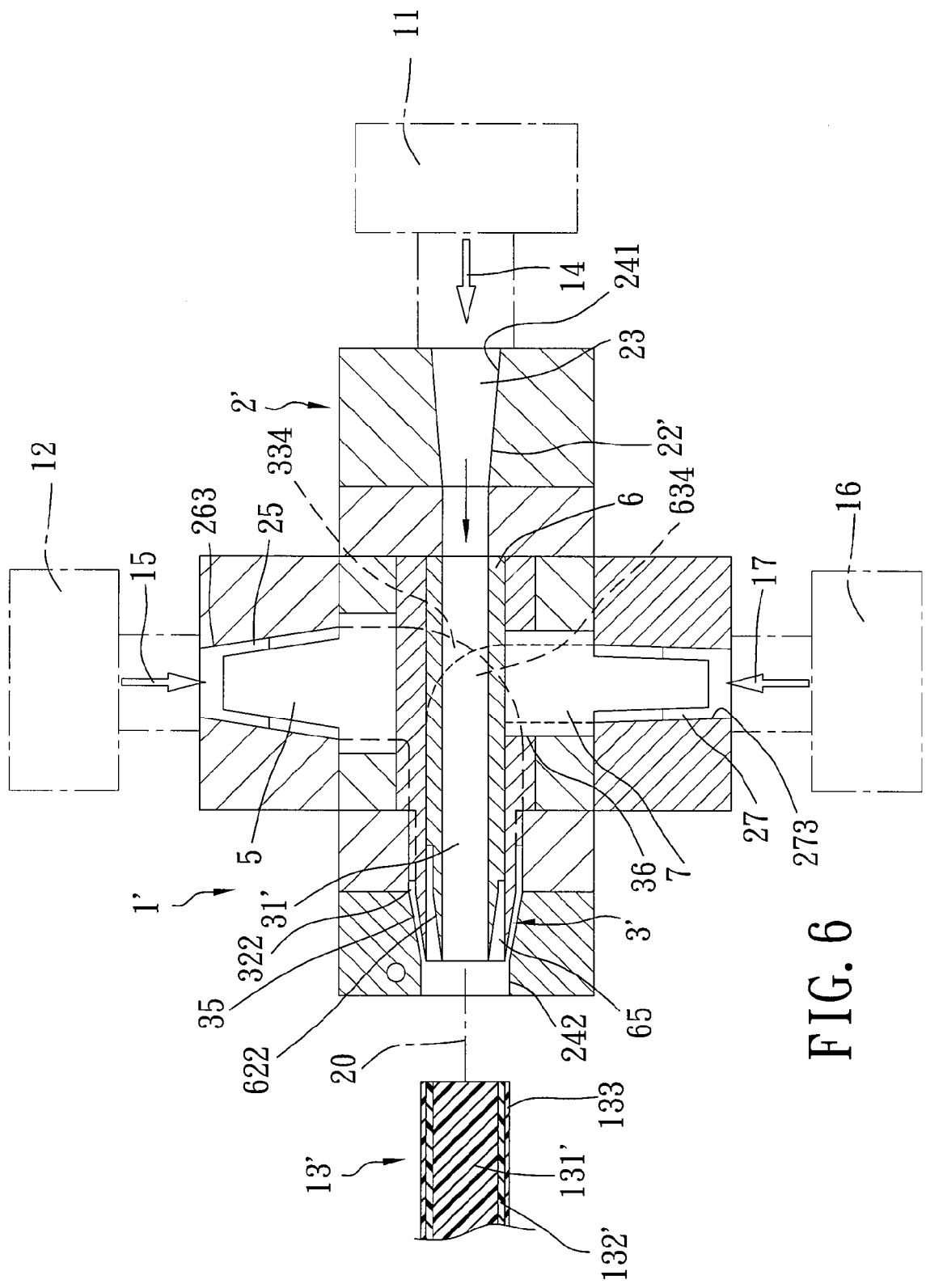
FIG. 6 is a sectional view of the second preferred embodiment in an assembled state.
Figure 7:
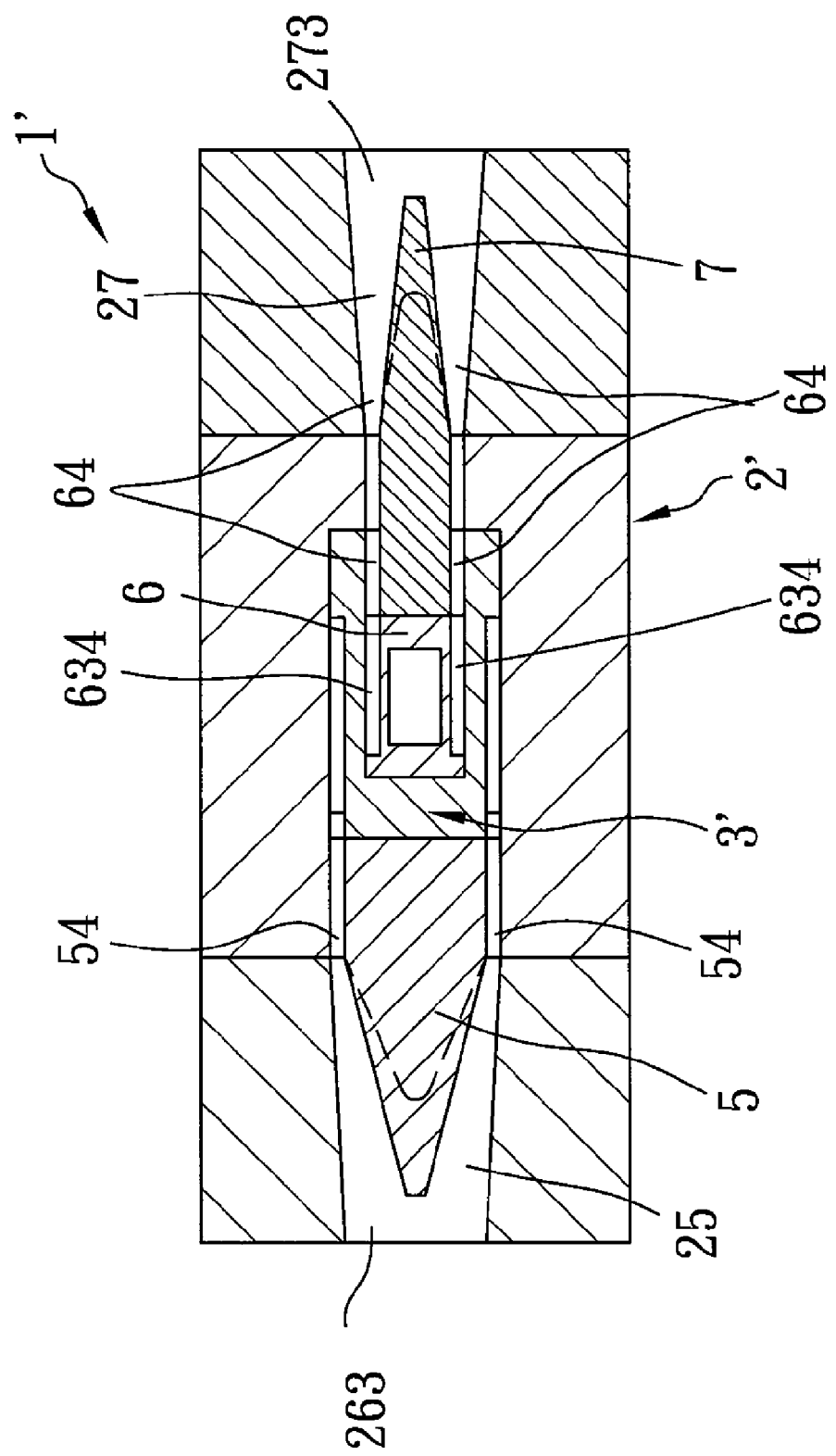
FIG. 7 is another sectional view of the second preferred embodiment in an assembled state.

Referring to FIGS. 5 to 7, an extrusion die assembly 1' according to the second preferred embodiment of the present invention is shown to be similar to the first preferred embodiment. However, in this embodiment, the extrusion die assembly 1' is used for extruding a plate 13' having a core 131', a first shell layer 132', and a second shell layer 133 surrounding the first shell layer 132'. The extrusion die assembly 1' cooperates simultaneously with three feeders 11, 12, 16 for supply of the first molten material 14, the second molten material 15, and a third molten material 17.

The hollow extrusion head 2' has a construction generally similar to that of the first preferred embodiment. However, in this embodiment, the extrusion head 2' further includes a second lateral passage inlet opening 273, and a third receiving space 27 having one end connected to the second lateral passage inlet opening 273 and the other end connected fluidly to the first receiving space 23 midway between the central passage inlet opening 241 and the die opening 242. The first flow-dividing core 3' further has an inner surface defining a core-receiving space 30, and a through hole 36 connected to the core-receiving space 30.

The extrusion die assembly 1' further comprises a second flow-dividing core 6 received in the core-retaining space 30 and coaxial with the first flow-dividing core 3', and a second flow-dividing block 7 disposed within the third receiving space 27 and extending into the through hole 36. The second flow-dividing core 6 has an inner surface defining the central passage 31', and a second grooved outer surface 631 that is formed with two grooves 632 that cooperate with the inner surface of the first flow-dividing core 3' to define two second accumulating passages 634 (only one is visible in FIG. 5). The second flow-dividing core 6 includes a second core base portion 621 that defines the second accumulating passages 634, and a second guide portion 622 smaller in cross section than the second core base portion 621. The second guide portion 622 extends from the second core base portion 621, and tapers toward the die opening 242. The first and second flow-dividing cores 3', 6 cooperatively define a second annular passage 65 (see FIG. 6) between the first and second guide portions 322, 622. The second annular passage 65 extends around the central passage 31', and is surrounded by the first annular passage 35.

The second flow-dividing block 7 is similar in construction to the first flow-dividing block 5, and cooperates with the head inner surface 22' to define two second lateral passages 64 which are respectively connected to the second accumulating passages 634. Since the purpose and structure of the second flow-dividing block 7 are similar to those of the first flow-dividing block 5, a detailed description of the same is dispensed herewith for the sake of brevity.

In use, the first molten material 14 is fed into the central passage 31' through the feeder 11, and flows to the die opening 242 so as to form the core 131'. The second molten material 15 is fed into the first lateral passage inlet opening 263 through the feeder 12, and is divided by the first flow-dividing block 5 to flow through the first lateral passages 54, the first accumulating passages 334, and into the die opening 242 so as to cover an outer surface of the core 131'. The second molten material 15 is to form the first shell layer 132'. The third molten material 17 is fed into the second lateral passage inlet opening 273 through the feeder 16, and is divided by the second flow-dividing block 7 to flow through the second lateral passages 64, the second accumulating passages 634, and into the die opening 242 so as to cover an outer surface of the first shell layer 132'. The third molten material 17 is to form the second shell layer 133.

The second preferred embodiment makes use of the coaxial first and second flow-dividing cores 3', 6 and the first and second flow-dividing blocks 5, 7 to simultaneously extrude the core 131' and the first and second shell layers 132', 133 to form the plate 13'. According to the present invention, the first and second shell layers 132', 133 can cover uniformly the core 131'.

Since the first and second receiving spaces 23, 25 are perpendicular to each other, the flow path of the second molten material 15 intersects the axial line 20 first, and then turns an angle of 90° so as to be parallel to the flow path of the first molten material 14. In order for the second molten material 15 to flow smoothly during turning, the speed of the flow of the second molten material 15 at two opposite turning sides thereof should be substantially the same. To achieve this result, the two wedge-shaped guide parts 34 are provided with different lengths. In particular, the length of the wedge-shaped guide part 34 that is proximate to the shorter turning side of the flow of the second molten material 15 is longer than the length of the wedge-shaped guide part 34 that is proximate to the longer turning side of the flow of the second molten material 15. However, there are many other methods available to modify the flow of the second and third molten materials 15, 17. One of the methods is to change an angle between the first receiving space 23 and the second receiving space 25 and between the first receiving space 23 and the third receiving space 27. In the first and second preferred embodiments, the angle between the first and second receiving spaces 23, 25 and between the first and third receiving spaces 23, 27 is 90°. When the angle is reduced to 30°, 45°, or 60°, the difference between the speeds at two opposite short and long turning sides of the flow of the second or third molten material 15, 17 may be reduced.

Further, in the second embodiment, the second and third receiving spaces 25, 27 are substantially aligned along a straight line. However, in actual practice, they may have a staggered arrangement depending on the kinds or flow speeds of the second and third molten materials 15, 17, so that the lengths of the second and third receiving spaces 25, 27 are different. As such, control of the speed of flow of the materials may be achieved.

Figure 8:
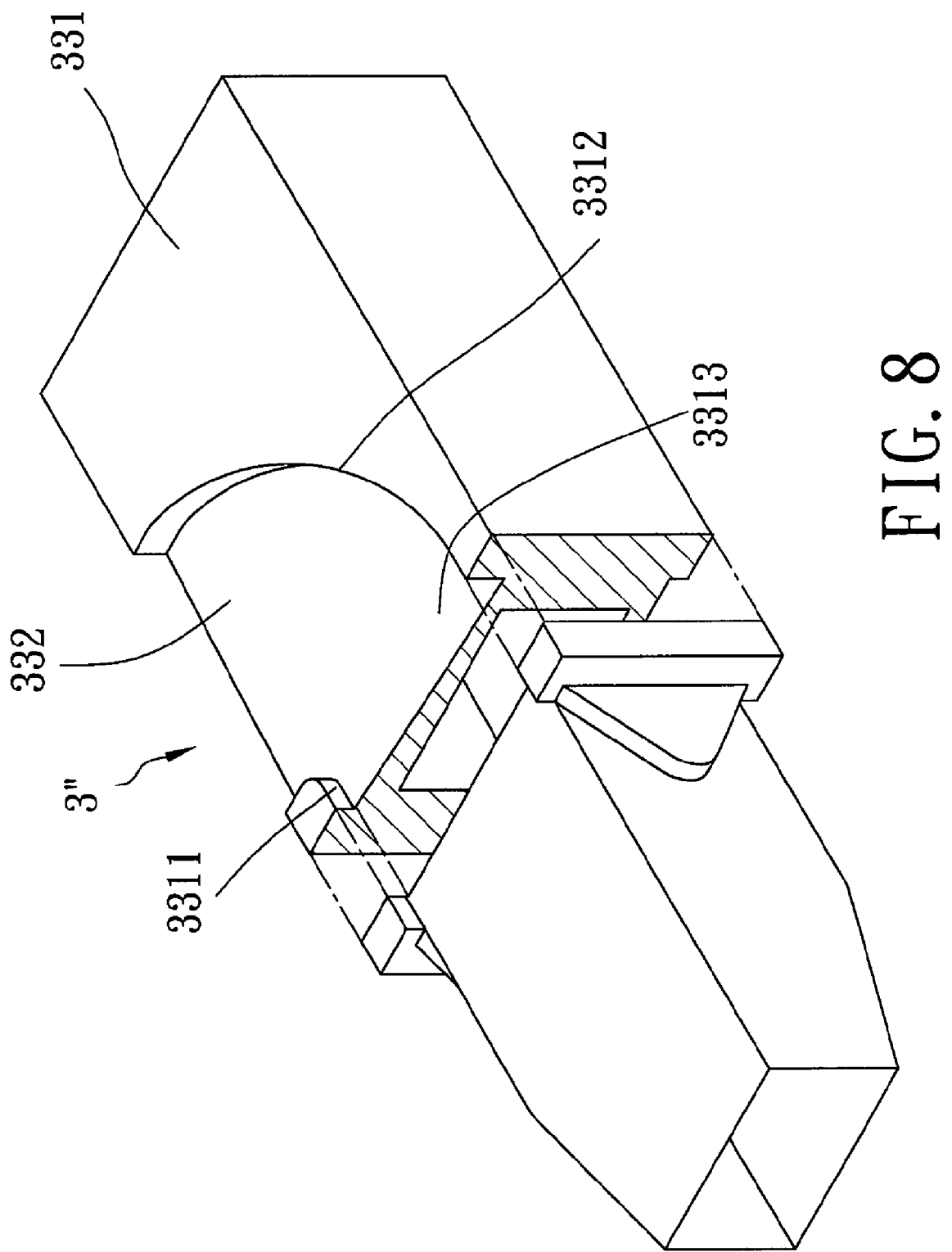
FIG. 8 is a perspective view of a first flow-dividing core of an extrusion die assembly according to the third preferred embodiment of the present invention.

FIG. 8 illustrates a first flow-dividing core 3" of an extrusion die assembly according to the third preferred embodiment of the present invention, which differs from the first preferred embodiment in that the groove 332 has a depth that is deeper proximate to the long curved groove wall 3312 compared to that proximate to the short curved groove wall 3311. As such, a groove bottom wall 3313 of the groove 332 is inclined, and the flow of the second molten material 15 along the long curved groove wall 3312 may be faster than that along the short curved groove wall 3311.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An extrusion die assembly comprising:
a hollow extrusion head including a head inner surface, a central passage inlet opening, a forming section having a die opening, a first receiving space that extends from said central passage inlet opening to said forming section, a first lateral passage inlet opening, and a second receiving space having one end connected to said first lateral passage inlet opening and the other end connected fluidly to said first receiving space midway between said central passage inlet opening and said die opening;
a first flow-dividing core disposed within said first receiving space, said first flow-dividing core being hollow and having a central passage connected to said central passage inlet opening and extending to said forming section, and a first grooved outer surface that is disposed upstream of said forming section and that has at least one groove which cooperates with said head inner surface to define at least one first accumulating passage;
a first annular passage formed in said forming section and around said first flow-dividing core and said central passage, said first annular passage being connected to said first accumulating passage and merging with said central passage in said die opening; and
a first flow-dividing block disposed within said second receiving space and dividing said second receiving space into two first lateral passages which are connected to said first lateral passage inlet opening, said first flow-dividing core and said head inner surface cooperatively defining a pair of said first accumulating passages which are respectively connected to said first lateral passages;
wherein said second receiving space has a block-retaining section proximate to said first accumulating passages, and a tapered section proximate to said first lateral passage inlet opening, said first flow-dividing block including a first block base portion retained in said block-retaining section, and a main wedge-shaped portion received in said tapered section and tapered from said first block base portion toward said first lateral passage inlet opening; and wherein said first flow-dividing block further includes two auxiliary wedge-shaped portions projecting respectively from two opposite sides of said main wedge-shaped portion and tapering from said first block base portion toward said first lateral passage inlet opening.

2. An extrusion die assembly comprising:

a hollow extrusion head including a head inner surface, a central passage inlet opening, a forming section having a die opening, a first receiving space that extends from said central passage inlet opening to said forming section, a first lateral passage inlet opening, and a second receiving space having one end connected to said first lateral passage inlet opening and the other end connected fluidly to said first receiving space midway between said central passage inlet opening and said die opening;

a first flow-dividing core disposed within said first receiving space, said first flow-dividing core being hollow and having a central passage connected to said central passage inlet opening and extending to said forming section, and a first grooved outer surface that is disposed upstream of said forming section and that has at least one groove which cooperates with said head inner surface to define at least one first accumulating passage; and a first annular passage formed in said forming section and around said first flow-dividing core and said central passage, said first annular passage being connected to said first accumulating passage and merging with said central passage in said die opening;

wherein said first flow-dividing core includes a first core base portion that has said first grooved outer surface, and a first guide portion smaller in cross section than said first core base portion, said first guide portion extending from said first core base portion and tapering toward said die opening, said first annular passage extending around said first guide portion upstream of said die opening; and wherein said first lateral passages are substantially perpendicular to said central passage, said first flow-dividing core further including two wedge-shaped guide parts that taper from said first core base portion toward said die opening and that project respectively from two opposite sides of said first guide portion.

3. An extrusion die assembly comprising:

a hollow extrusion head including a head inner surface, a central passage inlet opening, a forming section having a die opening, a first receiving space that extends from said central passage inlet opening to said forming section, a first lateral passage inlet opening, and a second receiving space having one end connected to said first lateral passage inlet opening and the other end connected fluidly to said first receiving space midway between said central passage inlet opening and said die opening;

a first flow-dividing core disposed within said first receiving space, said first flow-dividing core being hollow and having a central passage connected to said central passage inlet opening and extending to said forming section, and a first grooved outer surface that is disposed upstream of said forming section and that has at least one groove which cooperates with said head inner surface to define at least one first accumulating passage; and a first annular passage formed in said forming section and around said first flow-dividing core and said central passage, said first annular passage being connected to said first accumulating passage and merging with said central passage in said die opening;

wherein said groove is curved so that said accumulating passage is also curved, said groove being bounded by opposite short and long curved groove walls and having a depth that increases in a transverse direction from said short curved groove wall to said long curved groove wall.

4. The extrusion die assembly of claim 1, wherein said first receiving space has a mandrel-retaining portion proximate to said central passage inlet opening, and a core-retaining portion disposed between said mandrel-retaining portion and said die opening to retain said first flow-dividing core, said central passage being defined by an inner surface of said first flow-dividing core, said extrusion die assembly further comprising a mandrel retained by said mandrel-retaining portion and extending into said central passage.

5. An extrusion die assembly comprising:

a hollow extrusion head including a head inner surface, a central passage inlet opening, a forming section having a die opening, a first receiving space that extends from said central passage inlet opening to said forming section, a first lateral passage inlet opening, and a second receiving space having one end connected to said first lateral passage inlet opening and the other end connected fluidly to said first receiving space midway between said central passage inlet opening and said die opening;

a first flow-dividing core disposed within said first receiving space, said first flow-dividing core being hollow and having a central passage connected to said central passage inlet opening and extending to said forming section, and a first grooved outer surface that is disposed upstream of said forming section and that has at least one groove which cooperates with said head inner surface to define at least one first accumulating passage;

a first annular passage formed in said forming section and around said first flow-dividing core and said central passage, said first annular passage being connected to said first accumulating passage and merging with said central passage in said die opening; and a second flow-dividing core;

said first flow-dividing core further having an inner surface defining a core-receiving space that receives said second flow-dividing core, said second flow-dividing core having an inner surface defining said central passage, and a second grooved outer surface that is formed with two grooves that cooperate with said inner surface of said first flow-dividing core to define two second accumulating passages.

6. The extrusion die assembly of claim 5, wherein said hollow extrusion head further includes a second lateral passage inlet opening, and a third receiving space having one end connected to said second lateral passage inlet opening and the other end connected fluidly to said first receiving space midway between said central passage inlet opening and said die opening, said extrusion die assembly further comprising a second flow-dividing block disposed within said third receiving space and cooperating with said head inner surface to define two second lateral passages respectively connected to said second accumulating passages.

7. The extrusion die assembly of claim 6, wherein said first flow-dividing core further has a through hole connected to said core-receiving space, said second flow-dividing block extending into said through hole.

8. The extrusion die assembly of claim 7, wherein said first flow-dividing core includes a first core base portion that defines said first accumulating passage, and a first guide portion smaller in cross section than said first core base portion, said first guide portion extending from said first core base portion and tapering toward said die opening, said first annular passage extending around said first guide portion upstream of said die opening.

9. The extrusion die assembly of claim 8, wherein said second flow-dividing core includes a second core base portion that defines said second accumulating passages, and a second guide portion smaller in cross section than said second core base portion, said second guide portion extending from said second core base portion and tapering toward said die opening, said first and second flow-dividing cores cooperatively defining a second annular passage between said first and second guide portions, said second annular passage extending around said central passage and being surrounded by said first annular passage.

* * * * *